(No Model.)
F. H. UNDERWOOD.
FRICTIONAL GEARING.
No. 451,986. Patented May 12, 1891.
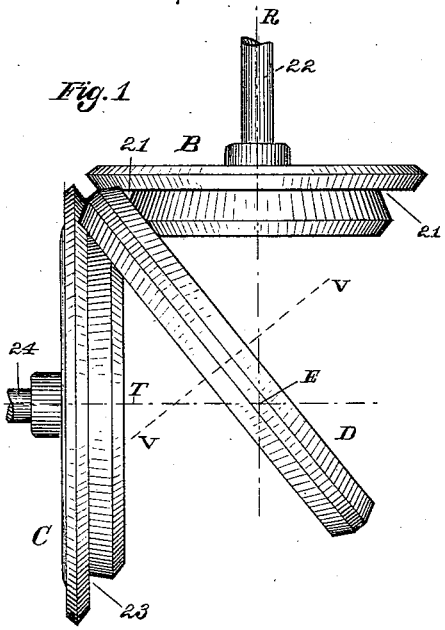
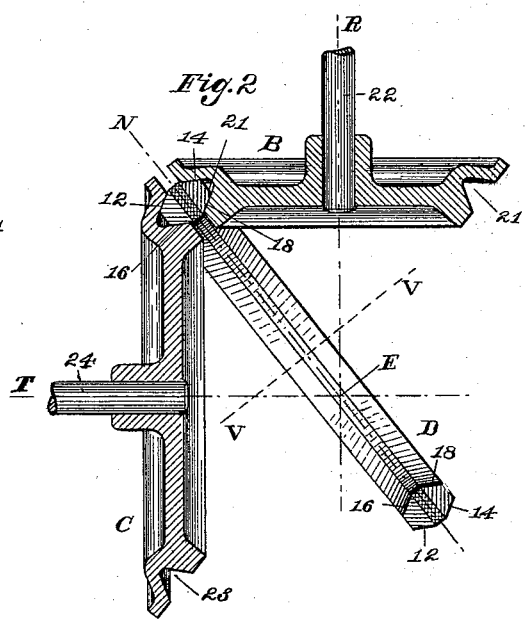
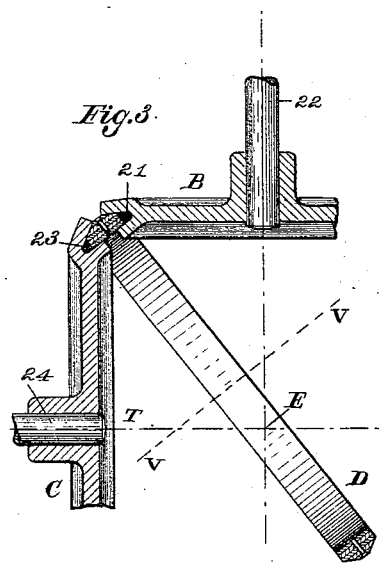
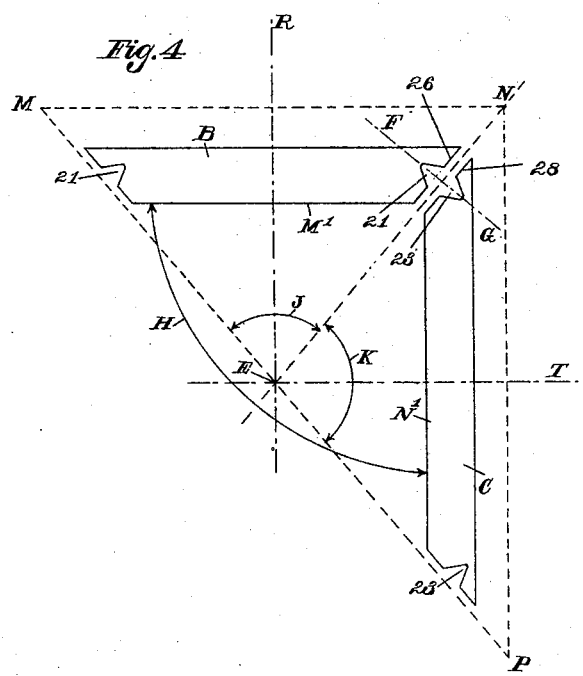
Witnesses:
Henry L. Reckard.
Lewis C. Heermann.
Inventor:
F. H. Underwood,
By his Attorney
F. H. Richards.

UNITED STATES PATENT OFFICE.

FRANK. H. UNDERWOOD, OF TOLLAND, CONNECTICUT.

FRICTIONAL GEARING.

SPECIFICATION forming part of Letters Patent No. 451,986, dated May 12, 1891.

Application filed August 5, 1890. Serial No. 361,060. (No model.)

*To all whom it may concern:*

Be it known that I, FRANK. H. UNDERWOOD, a citizen of the United States, residing at Tolland, in the county of Tolland and State of Connecticut, have invented certain new and useful Improvements in Conical Frictional Gearing, of which the following is a specification.

This invention relates to frictional gearing of the class wherein a driving-ring runs in engagement between the driving and driven wheels, the object being to provide frictional gearing of that class in which the shafts have their axes located in intersecting planes.

In the drawings accompanying and forming a part of this specification, Figure 1 is a plan view of a system of frictional gearing embodying my present improvements. Fig. 2 is a horizontal sectional view of a part of the apparatus. Fig. 3 is a view similar to Fig. 2, showing a modification of the apparatus. Fig. 4 is a diagrammatic view illustrative of the relations existing between the several members of the combinations shown in the preceding figures.

Similar characters designate like parts in all the figures.

The system of gearing shown in the drawings is of the class commonly designated "conical gearing," since the normal lines or faces of the wheels are cones whose angles are determined by the relation of the axes of the shafts, after the manner of conical or "bevel" spur-wheels.

In the drawings the wheels are designated by B and C, respectively, and are supported on the shafts 22 and 24, which are supposed to be carried by suitable bearings. (Not shown.) In the conical face of each wheel there is formed a groove for engaging the driving-ring D, which is or may be the improved driving-ring described and claimed in my application, Serial No. 361,059, filed August 5, 1890. Said ring has a series of frictional driving-faces, (designated by 12 and 14 and 16 and 18, respectively.) The groove 21 of the wheel B is formed symmetrically to a line F G, which is substantially vertical to the dotted line N E, which forms one side of each of the cones N E M and N E P of the respective wheels B and C. In the wheel C there is a corresponding groove 23, similarly formed in respect to said lines F G, N E M, and N E P. One side of the driving-ring D is inclosed in said grooves 21 and 23 of the wheels B and C, as best shown in Fig. 2, the plane of the driving-ring normally coinciding substantially with the dotted line N E, which, as above stated, forms one of the boundaries of the cones of said wheels. According to this arrangement of the several parts, the axis of the driving-ring D is a line V V crosswise to the cone boundary-line N E and intersecting the axes of said cones, which cone-axes coincide, of course, with the axes of the respective shafts 22 and 24.

For an illustration of the organization of the several elements of the combinations herein set forth, reference is made to Fig. 4 of the drawings, wherein is shown a pair of grooved conical wheels having their axes in intersecting planes, and having the grooves thereof constructed so that where the wheel-faces are contiguous said grooves form oppositely-disposed pairs of oppositely-disposed frictional driving-faces symmetrically arranged relatively to the line F G—that is, substantially vertical to the line E N, which coincides substantially with the line of the contiguous normal cone-faces of said cone-wheels. The normal cones of said wheels B and C are represented by the dotted lines M E N and N E P, respectively, the point E being the point of intersection of the planes of the wheel-axes E R and E T, respectively. The normal cone-angle of the wheel B is the angle M E N, and that of the wheel C is the angle N E P, these angles being designated by the arcs J and K, respectively. The line M N is parallel to the plane of revolution of the wheel B, while the line N P is parallel to the plane of revolution of the wheel C, which planes may be designated by the lines M' and N', corresponding to the inner faces of the said wheels, respectively. The intersection of the theoretical planes of revolution of the respective wheels will be at the intersection of the lines E N and F G, and the space between the planes of revolution of said wheels will be the space between said lines M' and N', represented by the distance H. In practice the adjacent faces 26 and 28, respectively, of the wheels B and C are not actually contiguous, since there should be between them a clear space, so that said wheels are, in practice, somewhat less in diameter than the normal cones thereof.

Referring to Fig. 2, the axis V of the driving-ring D intersects the axes E R and E T at angles corresponding, respectively, to the aforesaid cone-angles J and K, as will be understood by comparison with Figs. 2 and 4. Also it will be seen that the driving-ring D stands in the clear space H between the planes of revolution, as M' and N', and that the plane of revolution (E N, Fig. 2) of said driving-ring lies in the direction of the cone-line E N, when, as herein shown, the respective frictional driving-faces of the ring D and of the respective wheels are formed in oppositely-disposed pairs of oppositely-disposed frictional faces arranged symmetrically to the line F G, this line being substantially at right angles to said line E N.

One of the features of my present invention consists in the combination, with the conical grooved wheels, of a driving-ring having a compressively-elastic interior layer or "base-ring" of a disk shape and arranged to have its plane of revolution substantially in the line of the contiguous normal cone-faces of the wheels, whereby the respective friction-rims of the driving-ring contact with the respective wheels only, and whereby the said elastic base-ring cushions the action of said rims between the wheels, so as to secure a smooth and efficient action of the parts. This particular construction of the driving-ring itself is described and claimed in my aforesaid prior application.

Having thus described my invention, I claim—

1. In frictional gearing, the combination, with grooved wheels, substantially as described, having frictional driving-faces and carried by shafts located in crosswise directions, of a driving-ring engaging the groove-faces of the wheels and constructed to run in a plane intersecting the planes of revolution of the wheels at the place of intersection of said planes of revolution.

2. In frictional gearing, the combination, with grooved wheels, substantially as described, carried by shafts located in crosswise directions, of a driving-ring, substantially as described, engaging the groove-faces of the wheels and running in a plane corresponding substantially with the contiguous normal cone-faces of said wheels.

3. In frictional gearing, the combination, with grooved conical wheels carried by shafts located in crosswise directions, of the driving-ring engaging the groove-faces of said wheels and having its axis intersecting the axes of said wheels, respectively, at angles corresponding substantially with the respective cone angles of the wheels.

4. In frictional gearing, the combination, with grooved wheels carried by shafts located in crosswise directions, each of said wheels having a face-groove whose opposing faces constitute frictional driving-faces, and a driving-ring engaging on one side thereof the frictional driving-faces of said wheels and having its other side running in the space between the planes of revolution of the wheels.

5. In frictional gearing, the combination, with grooved wheels having their axes located in intersecting planes and their rims contiguous and having oppositely-disposed grooves whose opposing surfaces constitute frictional driving-faces, of a driving-ring having four frictional driving-faces arranged in oppositely-disposed pairs of oppositely-disposed faces, which correspond, respectively, to the driving-faces of said wheels and engage in the grooves thereof, the plane of revolution of the driving-ring being substantially in the line of the contiguous wheel-faces.

6. In frictional gearing, the combination, with grooved wheels having their axes located in intersecting planes and their rims contiguous and having oppositely-disposed grooves whose opposing sides constitute frictional driving-faces, of a disk-shaped compressively-elastic base-ring located in the plane of the normal cone-faces of said wheels, and a pair of disk-shaped friction-rims imposed on the opposite sides, respectively, of said base-ring and having their edges shaped to correspond with and frictionally engage the respective wheel-groove faces.

FRANK. H. UNDERWOOD.

Witnesses:
FRANCIS H. RICHARDS,
HENRY L. RECKARD.